| United States Patent [19] | [11] Patent Number: 4,926,183 |
|---|---|
| Fourdan | [45] Date of Patent: May 15, 1990 |

[54] RADAR, NOTABLY FOR THE CORRECTION OF ARTILLERY FIRE

[75] Inventor: Louis Fourdan, Antony, France

[73] Assignee: LMT Radio Professionnelle, Boulogne Billancourt, France

[21] Appl. No.: 302,249

[22] Filed: Jan. 27, 1989

[30] Foreign Application Priority Data

Jan. 29, 1988 [FR] France ................. 88 01038

[51] Int. Cl.⁵ ............................................. G01S 9/02
[52] U.S. Cl. ........................................ 342/67; 342/189
[58] Field of Search ................ 342/67, 139, 146, 147, 342/158, 189

[56] References Cited

U.S. PATENT DOCUMENTS

| 3,710,384 | 1/1973 | Ashcraft | 342/158 |
| 3,956,749 | 5/1976 | Magorian | 342/158 |
| 4,042,927 | 8/1977 | Helms . | |
| 4,052,721 | 10/1977 | Ross . | |
| 4,665,400 | 5/1987 | Törby | 342/158 |

FOREIGN PATENT DOCUMENTS 2402971 4/1979 France .

Primary Examiner—Thomas H. Tarcza
Assistant Examiner—Mark Hellner
Attorney, Agent, or Firm—Oblon, Spivak, McClelland, Maier & Neustadt

[57] ABSTRACT

A radar, notably for the correction of artillery fire, comprises means for an antenna scan, in bearing, in a limited zone $\Delta G$ around a central position coinciding with the objective in that, and means to compare the received signals with a set of reference signals representing the responses awaited from virtual targets that are evenly spaced out, in bearing, within the monitored space $\Delta G$.

6 Claims, 3 Drawing Sheets

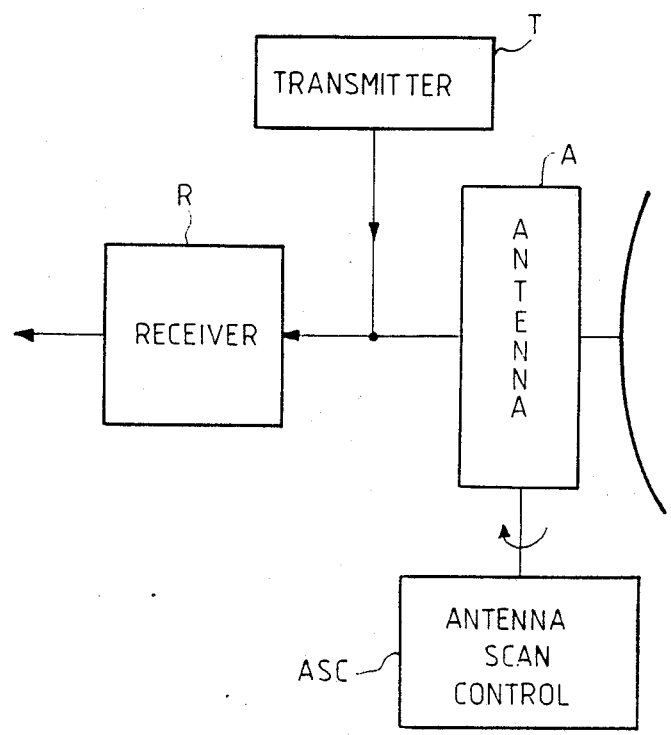
FIG_1-a

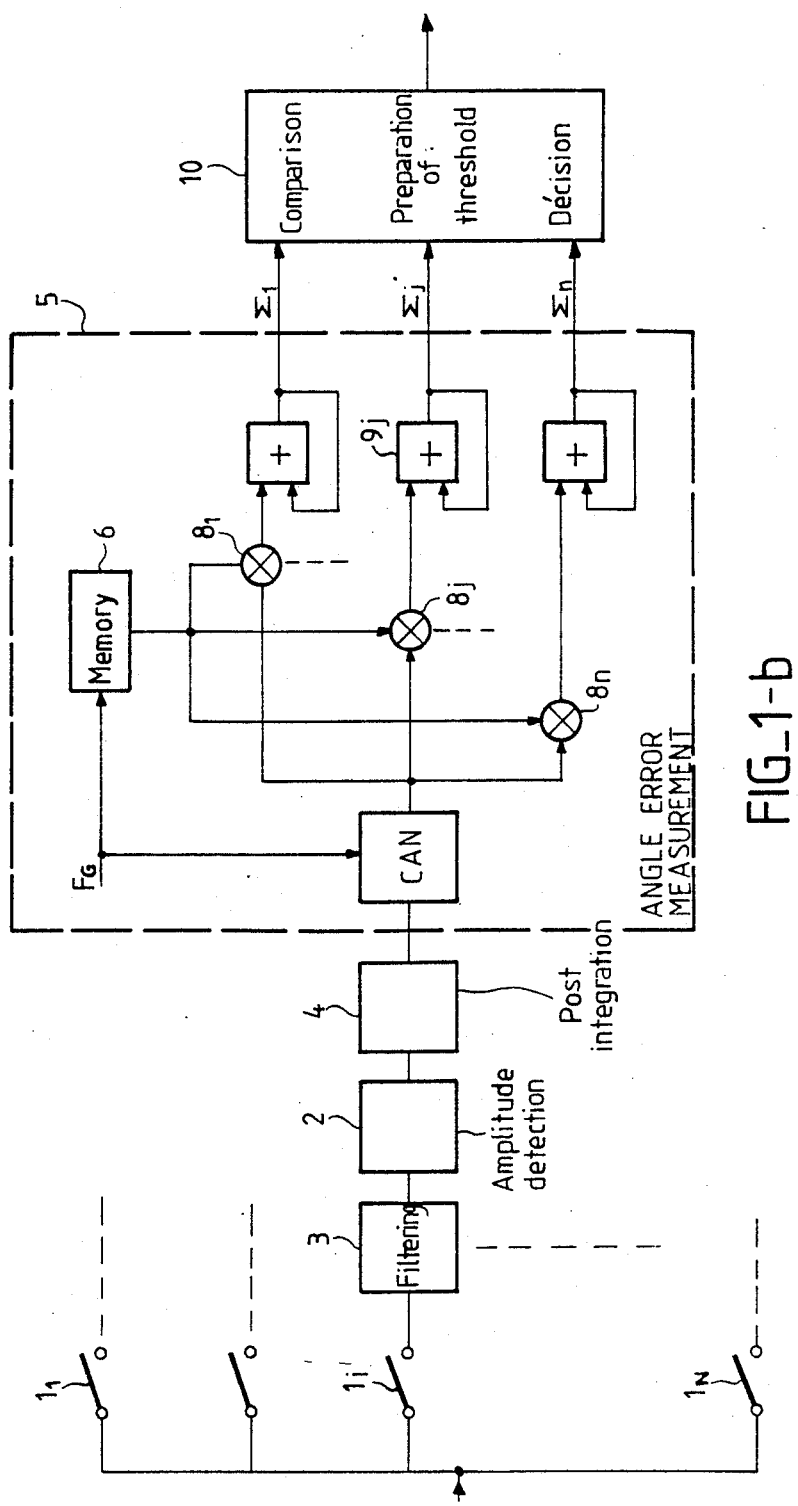
FIG_1-b

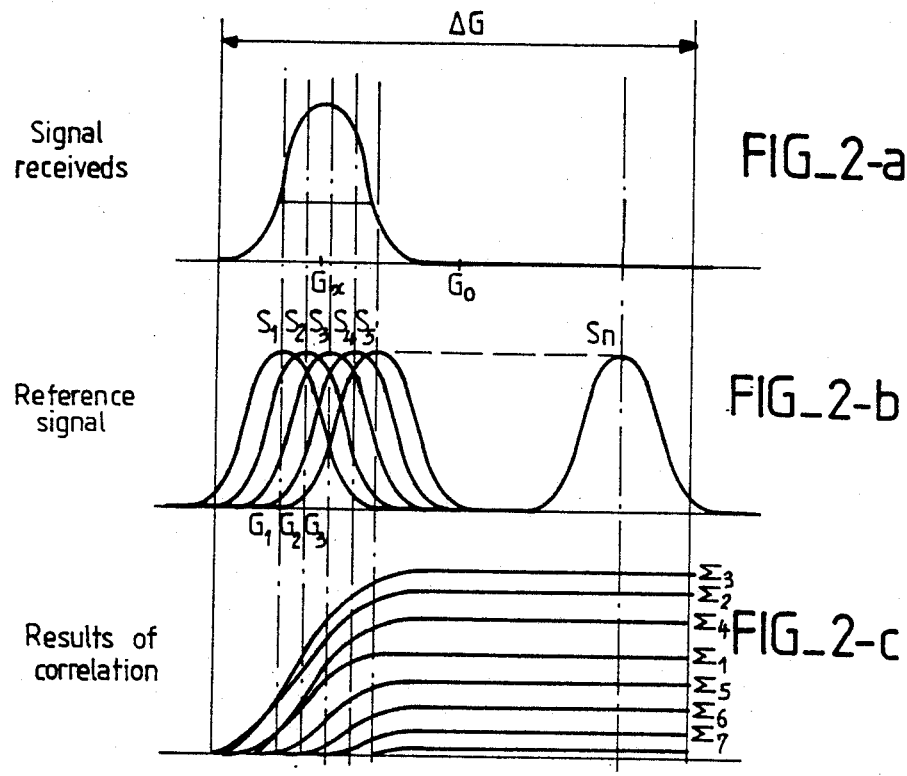

RADAR, NOTABLY FOR THE CORRECTION OF ARTILLERY FIRE

BACKGROUND OF THE INVENTION

1. Field of the Invention

The present invention concerns a radar system, notably for the correction of artillery fire.

2. Description of the Prior Art

The correction of the firing of shells (or rockets) requires a preliminary appreciation of the error between the objective that is aimed at and the explosion of the shell. The usual method used to determine the angle error, between the objective that is aimed at and the explosion of the shell, is an angle error measurement method based on the use of a radar of the "monopulse" type, i.e. a radar where the antenna has two distinct and complementary patterns: one sum pattern $\Sigma$, which is the usual pattern, i.e. with a maximum gain in the axis of the antenna, and a difference pattern $\Delta$ having, on the contrary, a null gain along this very same axis and for which the phase with reference to E changes sign on either side of this axis. The ratio $\Delta/\Sigma$ between the amplitudes of the signals reflected by a determined target, respectively obtained at the corresponding $\Delta$ and $\Sigma$ channels, represents, to a certain extent, the angle error between this target and the axis of the antenna.

While this method of error measurement gives good results when applied to the tracking of a target, it has a major drawback in the measurement of errors between the explosion of the shell and the objective aimed at. This drawback is that the ratio $\Delta/\Sigma$ represents the angle error only in a limited zone of the pattern $\Delta$ where this pattern is linear.

SUMMARY OF THE INVENTION

An object of the present invention is a radar, notably for correction of artillery fire, comprising means to provide for an antenna scan, in bearing, in a limited zone $\Delta G$ around a central position coinciding with the objective aimed at, and means to compare the signals received with a set of reference signals representing the responses awaited from virtual targets evenly spaced out, in bearing, within the monitored space $\Delta G$.

BRIEF DESCRIPTION OF THE DRAWINGS

Other objects and features of the invention will appear more clearly from the following description of an embodiment, made with reference to the figures appended hereto, of which:

FIG. 1a is a block diagram of a ground surveillance radar of known type to which the present invention may be applied;

FIG. 1b is a diagram showing the processing done, in reception, in a radar according to the invention;

FIGS. 2a, 2b, 2c are graphs illustrating the correlation operations performed in a radar according to the invention.

DESCRIPTION OF THE PREFERRED EMBODIMENT

The invention shall be described more particularly in the context of its application to a ground surveillance radar of the pulse Doppler type.

A simplified block diagram of such a radar is shown in FIG. 1a. The radar comprises mainly a rotating antenna A, the scanning of which is controlled by antenna scan control means ASC, a transmitter T and a receiver R connected to the antenna A.

The signal processing operation performed at reception is shown in FIG. 1b.

The bipolar video signal coming from a receiver (not shown in this figure) is applied to a set of distance selectors $1_i$, enabling the same processing operation to be performed simultaneously in parallel on the different distance resolution cells of the radar. To simplify the description, FIG. 1 shows only the processing operation performed after the distance selector $1_i$.

This processing operation comprises an amplitude detection (2), preceded by a "anti-clutter" and Doppler filtering (3) and followed by a post-integration operation (4).

The error between the objective aimed at and the explosion of the shell is measured by means of an error measuring device 5, the principle of which assumes an antenna scan, in bearing, in a limited zone $\Delta G$ around a central position $G_O$ coinciding with the objective aimed at. This antenna scan is controlled by the antenna control means ASC (FIG. 1a).

The amplitude detector 2 is a linear detector. The shape of the signal coming from this detector, corresponding to a target, in this case an explosion of a shell, having a bearing $G_x$ (to be determined), is shown in FIG. 2a. This signal has an amplitude modulation defined by the shape of the antenna pattern.

The received signal is compared with "n" signals called "reference" signals, shown in FIG. 2b and corresponding to the signals which would be received from targets that are evenly spaced out in bearing ($G_1$, $G_2$, ... $G_n$) within the scanned zone $\Delta G$.

In the embodiment which is now described, this comparison is made by correlation which is itself done digitally: the embodiment could equally well comprise a comparison done with analog circuits.

The shape of the reference signals, which is known once the shape of the antenna pattern is known, is stored in a memory 6, in the form of digitalized samples of these signals, spaced out at a bearing sampling period $T_G$ equal, for example to a multiple, which may or may not be a whole number, of the pulse repetition frequency of the radar.

The received signal S, coming from the linear amplitude detector 2, is digitalized in a sampler-encoder 7, at the same sampling frequency $FG = 1/T_G$.

Each sample of the received signal is multiplied in "n" multipliers $8_j$, respectively, with the same-order sample of one of the "n" reference signals $S_j$ (with $1 \leq j \leq n$) read in the memory 6. The multiplication results obtained for the successive samples, with respect to the scanned zone $\Delta G$, are accumulated in "n" accumulators $9_j$.

The "n" correlation results, the shape of which is shown in FIG. 2c, obtained at the output of the "n" accumulators $9_j$, are then compared, with a view to determining the result $\Sigma_j$ having the greatest value, in which case the bearing $G_x$ sought is represented with greater precision by the corresponding bearing $G_j$. In the example shown in FIG. 2, it is the bearing $G_3$.

The "n" correlation results are, besides, used to prepare a threshold with which the previously chosen result $\Sigma_j$ is then compared, in order to perform the standard decision operation that comes into play in any radar receiver.

More precisely, this threshold S is prepared by taking a mean of the "n" correlation results, then a product of this mean by a coefficient "k", determined in a standard way by simulation or experiment.

These operations for the comparison of the n correlation results, preparation of the threshold and decision have been combined in one and the same device 10.

It would also be possible to reverse the order of the operations for comparing the correlation results and for decision with respect to the threshold. In this case, each correlation result would have to be compared with the threshold.

The processing operation thus described is made for each of the distance channels selected by the N distance selectors $1_i$. The memory 6 may be common to these different channels, in which case an additional operation for addressing in distance should be provided for.

The results (searching for the highest correlation result and comparison with the threshold) for each of the distance channels are obtained, each time, at the end of the scanning of the zone $\Delta G$ to be monitored. These results may be displayed inside a distance/bearing grid on a display screen.

Each end of a scanning operation, from right to left or left to right, is accompanied by a resetting of the accumulators. The results relating to several successive scanning operations can be maintained simultaneously on the display screen so as to facilitate the firing correction.

What is claimed is:

1. A radar, notably for correcting of artillery fire, including a directionally scanned antenna and a receiver, said radar comprising:
   means for providing an alternate bearing can of said antenna, in a limited zone $\Delta G$ around a central position coinciding with a targeted object;
   means for comparing the signals received by said receiver, during each scan of said zone $\Delta G$, with a set of reference signals representing the responses awaited from virtual targets evenly spaced out, in bearing, within said zone $\Delta G$; and
   means for determining the one of said reference signals for which said comparing means delivers a maximum result in order to obtain the bearing of an eventual target in said zone.

2. A radar according to claim 1, further including means for ensuring a linear detection of amplitude of said received signals before applying them to said comparing means.

3. A radar according to claim 1, wherein said comparing means includes a correlating means.

4. A radar according to claim 3 further comprising sampling means for sampling, in bearing, said received signals wherein said correlating means comprises:
   a memory for storing amplitudes of successive samples of each of said reference signals;
   a plurality of multipliers connected to said sampling means and said memory for multiplying each sample of said received signals by the samples, with the same order, of said reference signals respectively; and
   a plurality of accumulators connected respectively to said multipliers for accumulating the multiplication results relative to the successive samples of said received signal during a scan of said zone $\Delta G$.

5. A radar according to claim 4, wherein said determining means include:
   first mean for preparing a threshold value from the means of the values provided by said accumulators at the end of any given scan of said zone $\Delta G$;
   second means for determining the one of said accumulators providing the maximum value at the end of said given scan; and
   third means for comparing said maximum value to said threshold in order to determine if a target is present, the bearing of said target being given by the rank of said reference signal corresponding to said maximum value.

6. A radar according to claim 1 comprising a plurality of distance selectors fed with said received signals and providing respective distance resolution cell signals, wherein said means to compare and said means for determining are adapted to process each of said distance resolution cell signals separately.

* * * * *